United States Patent Office 3,474,030
Patented Oct. 21, 1969

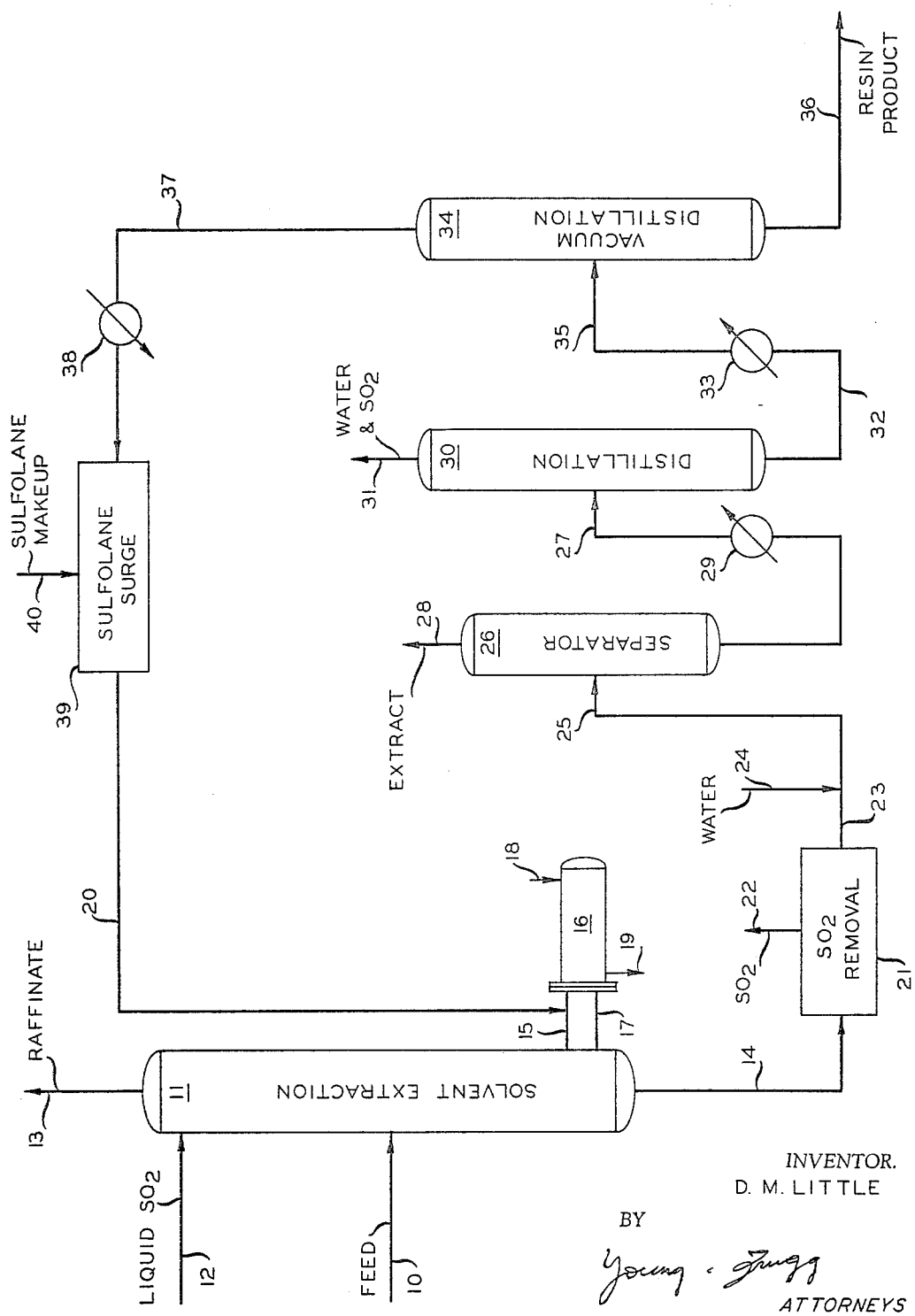

3,474,030
PREVENTING SO₂ RESIN FORMATION
WITH A SULFOLANE
Donald M. Little, Bartlesville, Okla., assignor to Phillips
Petroleum Company, a corporation of Delaware
Filed Oct. 9, 1967, Ser. No. 673,607
Int. Cl. C10g 21/10, 21/22
U.S. Cl. 208—338                        8 Claims

ABSTRACT OF THE DISCLOSURE

Dissolution of resinous materials formed from $SO_2$ and unsaturated materials coming in contact with $SO_2$, for example, during the $SO_2$ solvent extraction of hydrocarbon mixtures by contacting the resinous materials at an elevated temperature with a sulfolane.

Background of the invention

This invention relates to the operation of processing equipment wherein the formation of resinous deposits is minimized and resinous deposits inadvertently formed are removed by dissolution with a solvent. In another aspect, this invention relates to the provision of means and method whereby certain fouling of equipment due to resinous deposits in an extraction unit can be substantially avoided. A further aspect of this invention relates to the substantial avoidance of resinous deposits within or upon heating or cooling or other surfaces of chiller means incorporated in a $SO_2$ extraction unit for the purpose of chilling the extract produced therein. In still a further aspect, this invention relates to the dissolution of $SO_2$ resinous materials formed from $SO_2$ and unsaturated materials contained in mixtures coming in contact with $SO_2$ by dissolving with a sulfolane.

The use of a liquid sulfur dioxide extraction for the removal of aromatic constituents from hydrocarbon oils containing aromatics such as cycle oils recovered from catalytic and thermal cracking units is now practiced in the petroleum industry. These units can be used for several purposes, such as improving the quality in catalytic cracking unit feed stocks, or for production of concentrated aromatic fractions, such as raw materials for the production of chemicals, and for the production of carbon black.

In an $SO_2$ extraction unit, oil, $SO_2$ and unsaturated compounds contained in the oil combine to form resins. These resins have little or no solubility in oil, $SO_2$, or common organic solvents and generally are deposited in equipment such as coolers, heaters, reboilers, etc., fouling the equipment, thus causing shut downs for clean out.

In accordance with the present invention, it has been found that certain solvents are effective for the removal of resinous deposits, particularly the resinous deposits formed in $SO_2$ extraction units, thus facilitating equipment clean out and reducing down time of the extraction unit.

Accordingly, the object of this invention is to provide a method for dissolving resins formed from $SO_2$ and unsaturated materials.

Another object of this invention is to provide a solvent that will dissolve resinous deposits from equipment utilized for $SO_2$ extractions.

A further object of this invention is to minimize the formation of resinous deposits during the operation of a unit employing $SO_2$ and to provide a practical method for removing resinous materials inadvertently formed during operation of the process.

Other objects, aspects as well as the several advantages of the invention will be apparent to those skilled in the art upon reading the specification, drawing, and the appended claims.

Summary of the invention

According to the invention, I have found that resinous materials formed from $SO_2$ and unsaturated materials contained in hydrocarbon oils coming in contact with $SO_2$ can be dissolved by contacting with at least one sulfolane.

Further, according to the invention, the formation of resinous deposits in $SO_2$ extraction units is minimized and resinous deposits formed during extraction are dissolved by carrying out the $SO_2$ extraction in the presence of a sulfolane which dissolves resinous deposits present therein.

More specifically, according to the invention, sulfolane is introduced into the solvent extract phase before it is chilled in the chiller so that deposition of resinous materials in the extract phase being chilled is prevented.

Further, in accordance with the invention, an extract produced by solvent extracting cracked gas oil with liquid sulfur dioxide which contains resinous materials formed during the extraction are removed from the extract phase by a multiple step process comprising (a) injecting a sulfolane into the extract phase to dissolve the resins, (b) subjecting the extract phase containing sulfolane and dissolved resinous materials to $SO_2$ recovery, (c) injecting water into the remaining extract oil, (d) separating from the water phase the oil phase which is subsequently dehydrated and recovered as product extract, (e) distilling the water phase of (b) to remove $SO_2$ and water, (f) subjecting the distillation residue to vacuum distillation to recover sulfolane for recycle, and (g) recovering the resinous materials from the vacuum distillation unit.

Description of preferred embodiments

Sulfolanes that can be employed according to the invention for dissolving $SO_2$ resinous materials have the formula

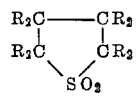

wherein R is hydrogen or alkyl groups of 1–5 carbon atoms per molecule.

Some suitable specific sulfolanes that can be employed having the above-defined formula include sulfolane (tetrahydrothiophene 1,1-dioxide), 2-methyl-sulfolane, 3-methyl-sulfolane, 2-ethyl-sulfolane, 3,4-dimethyl-sulfolane, 2,5-dimethyl-sulfolane, 2,4-dimethyl-sulfolane, 2-methyl-5-ethyl-sulfolane, 3-propyl-sulfolane, 2-pentyl-sulfolane, 3-butyl-sulfolane, and the like, and mixtures thereof.

The amount of sulfolane employed to dissolve the $SO_2$ resinous materials will vary appreciably depending upon various factors including the type of hydrocarbon oil being subjected to $SO_2$ extraction, the conditions for carrying out the extraction, and the like. Ordinarily the amount of sulfolane introduced into the $SO_2$ extraction unit will be about 1 to 15 weight percent of the $SO_2$ or about 3 to 10 weight percent of the extract oil yield.

The sulfolanes employed for dissolving the $SO_2$ resinous materials according to the invention have been found to be most effective when contacting of the resinous materials is effected at elevated temperatures. It is feasible to utilize the sulfolanes at temperatures up to their boiling point. However, for practical reasons and more effective dissolution of $SO_2$ resinous materials, the temperature for contacting of the $SO_2$ resinous materials will ordinarily be in the range of 200–450° F. However, lower temperatures can be used.

The operation of a liquid sulfur dioxide extraction unit utilizing the invention is illustrated schematically in the drawing.

Oil charge, which can be cycle oil from a cracking operation, is passed through conduit 10 into sulfur dioxide extraction column 11. In column 11, the cycle oil which has been introduced at a locus intermediate the ends of the column, is admixed with liquid sulfur dioxide charged to an upper portion of the column by conduit 12, forming a raffinate phase and an extract phase. In the column, the raffinate phase, consisting essentially of non-aromatic constituents of the cycle oil and a small amount of sulfur dioxide, travels upwardly. This raffinate phase is removed from tower 11 by way of conduit 13. Upon removal from column 11 the raffinate solution is treated by means not shown, suitably an evaporator means, to recover therefrom whatever sulfur dioxide is contained therein following which the raffinate oil can be passed to a catalytic or other hydrocarbon conversion operation, or other usage such as blending in other hydrocarbon products.

In column 11, the extract phase containing sulfur dioxide with dissolved aromatic constituents of the cycle oil travels downwardly and is ultimately withdrawn from column 11 through conduit 14, and passed to recovery means hereinafter described in more detail. The lower portion of column 11 is provided with a draw-off draw tray, not shown, from which there is withdrawn through conduit 15 at least a portion of the extract phase formed in column 11, and this extract phase is passed into extract chiller 16 through which it is conducted by means of tubes contained in the chiller. The tubes in the chiller are surrounded by a cold medium which serves by heat transfer through the tubes to chill the extract within the tubes. The extract thus chilled is then returned to column 11 by way of line 17. Coolant is introduced into chiller 16 by way of line 18 and removed by way of line 19.

According to this invention, I have found by introducing a sulfolane, as described above, preferably as a liquid, into the solvent extraction unit, the formation of resinous deposits is minimized and resinous deposits formed inadvertently are readily removed by being dissolved by the sulfolane and removed from the system by way of the extract phase.

The invention is equally applicable to the cleaning or washing of process equipment having resinous deposits on the various pieces of apparatus by dissolving the resinous deposits with a sulfolane and separating the sulfolane from the dissolved resinous materials. Thus, I have found a simple, yet completely effective, procedure for removing resinous deposits, thus facilitating equipment clean out and reducing down time of $SO_2$ extraction units.

According to one embodiment of the invention, sulfolane is introduced by way of line 20 into the extract phase passed to chiller 16 by way of line 15. The sulfolane is added in an amount effective to prevent any substantial deposition of resinous materials within the chiller zone and extraction column, and will generally be less than about 10 weight percent of the extract oil yield, preferably not more than about 5 weight percent.

In some operations, the bottom zone of the extraction column, may be maintained as low as about 30° F. in order to improve the aromaticity of the extract. Even at this low temperature, the added sulfolane dissolves or maintains in solution this resinous material.

The sulfolane functions to dissolve resinous materials formed in the $SO_2$ extraction unit and is removed along with the extract phase by way of line 14. The extract phase is passed to $SO_2$ removal unit 21 wherein the $SO_2$ is stripped from the extract phase and removed from unit 21 by way of line 22 and passed to condensation or recycle for reuse in column 11.

The extract phase containing sulfolane and dissolved resinous materials is removed from zone 21 by line 23, contacted with water introduced by way of line 24, and the mixture thus formed is passed through line 25 to separation zone 26. In separation zone 26 the water phase is removed by way of line 27 and an oil phase by way of line 28. The oil phase removed by line 28 can be subjected to drying and recovery of aromatic extract product.

The water phase in line 27 is heated by way of heater 29 and passed to distillation zone 30. In distillation zone 30 water and $SO_2$ are removed overhead by way of line 31 and sulfolane and dissolved resinous materials by way of line 32. Sulfolane and dissolved resinous materials are heated by heater 33 and introduced into vacuum distillation unit 34 by way of line 35. The resinous materials are removed by way of line 36 and sulfolane by way of line 37. The sulfolane is cooled and condensed by cooler 38, and passed to a surge tank 39 wherein makeup sulfolane can be introduced by way of line 40. The sulfolane thus recovered is then passed by way of line 20 for reuse in the process by introducing same into the extract phase once again.

As an example of operation of the invention, the charge which is a cycle oil, as defined herein and which can have a boiling range of approximately 325–750° F., is introduced into tower 11 which will have a top temperature from about 50 to about 70° F., and the tower bottom will have a temperature of about 30° F. To maintain the tower bottom temperature, the oil leaving chiller 16 by way of line 17 will have a temperature not over 30° F., preferably a temperature somewhat lower than about 30° F. Sulfolane is introduced as a liquid into the extract phase entering chiller 16 to minimize deposition of the resinous material in the system. Continuous or intermittent injection of sulfolane can be practiced according to the invention. Although the sulfolane is shown as being added to the extract, it can be added to the $SO_2$ solvent, or to the raffinate (upper section) zone of the extraction column, or even added to feed oil.

Specific example

Solubility tests were made on a sample of resinous deposit obtained from the steam preheater (not shown) for a sulfur dioxide extract stream in an operation wherein no sulfolane had been used. The deposit appeared to be carbonaceous granules cemented together with a resinous binder. Solubilities for this resinous deposit were determined in sulfolane, furfural, acetone, and aqueous caustic (NaOH) solution. Solubility data are shown in Table I.

In the table, solubility includes not only that the material actually dissolved, but also that a portion of the material disintegrates into finer than 16 mesh as a result of solution or softening of the binder. The lumps of resinous deposit were weighed into the solvent and soaked and washed through a 16 mesh screen. The solvent to deposit ratio was 10:1 and contact time for most solvents was 20 to 24 hours.

TABLE I.—SOLUBILITY [1] OF DEPOSITS FROM SO₂ EXTRACTION HEAT EXCHANGERS

| | | Deposit/Solvent 1/10 (wt.) |
|---|---|---|
| Furfural: | | |
| Furfural | Cold | 20% Soluble. |
| | Hot (200° F.) | 70% Soluble. |
| Sulfolane | Cold | 25% Soluble. |
| | Hot (200° F.) | 75% Soluble. |
| Sulfolane saturated with SO₂ | Cold | 25% Soluble. |
| | Hot (200° F.) | 80% Soluble. |
| Acetone | Cold | Insoluble. |
| | Hot (140° F.) | 10% Soluble. |
| 5% NaOH aqueous solution | Cold | 50% Soluble.[2] |
| | Hot (200° F.) | 95–99% Soluble. |

[1] Amount that could be washed through a 16 mesh screen, soaking time 20-24 hours.
[2] After 5 hours.

The analysis for the resinous deposit employed above was as follows:

Table II

| Component: | Weight percent |
|---|---|
| Carbon | 41 |
| Hydrogen | 7 |
| Sulfur | 23 |
| Oxygen | 18 |
| Nitrogen | 0.13 |
| Iron | 2 |
| Ash (HCl insoluble) | 7 |
| Undetermined | Remainder |

It will be noted from the above table that sulfolane was the best solvent for these resinous materials. Although the aqueous caustic (NaOH) solution shows a higher solubility, it cannot be readily employed especially at the higher temperatures due to caustic embrittlement of the heat exchanger metals. It will be also observed from the above data that at the higher temperatures, sulfolane showed a higher percentage of solubility for the resinous material. Since sulfolane has an atmospheric boiling point of about 549° F., the resinous materials should be substantially completely dissolved at higher temperatures of the order of 350–450° F.

I claim:

1. In a process for separating a mixture of saturated, aromatic and unsaturated hydrocarbons comprising extracting said mixture with $SO_2$ (sulfur dioxide) in an extraction zone to form raffinate and extract phases and wherein fouling within the extraction zone occurs, the step of minimizing the formation of and dissolving of resinous deposits formed from $SO_2$ and said unsaturated hydrocarbons during said extracting which comprises conducting said extracting in the presence of a sulfolane in an amount effective to prevent any substantial deposition of resinous materials within said extraction zone and sufficient to dissolve resinous deposits formed inadvertently and already present in said extraction zone and associated processing equipment.

2. A process according to claim 1 wherein the amount of sulfolane present during said extracting is from about 1 to 15 weight percent of the $SO_2$.

3. A process according to claim 1 wherein the process employed is $SO_2$ extraction of a cycle oil obtained from the catalytic cracking of hydrocarbon oils.

4. The process according to claim 1 wherein the sulfolane and dissolved resinous materials are removed with the extract phase, separated therefrom and sulfolane recycled to the solvent extraction for reuse therein.

5. The process according to claim 1 including a chilling zone wherein (a) the sulfolane is introduced into a solvent extraction chilling zone and then into the solvent extraction zone, (b) the resinous materials present in said extraction chilling zone and said extraction zone are dissolved by the sulfolane and are removed with the extract phase, and (c) the extract phase is subjected to $SO_2$ removal, recovery of extract oil, separation of resinous materials and recovery of sulfolane and recycle of same to the chilling zone.

6. The process according to claim 1 additionally including a chiller zone employed with the extraction zone and in which chiller zone an aromatic oil containing resins formed during extraction is chilled, the step of introducing and admixing sulfolane with said oil before it is chilled in said zone to dissolve said resins and to prevent fouling of the equipment.

7. A process according to claim 1 for the recovery of an aromatic-rich phase oil from an oil comprising aromatic constituents and constituents more saturated than said aromatic constituents which comprises feeding said oil to a selective solvent extraction zone, contacting said oil with liquid $SO_2$ solvent, thus producing a raffinate phase rich in non-aromatics which is removed and recovered as an upper phase, and an extract phase rich in aromatics which is removed as a lower phase, introducing into said solvent extraction zone sulfolane to dissolve $SO_2$ resinous materials formed during said contacting, and removing said sulfolane and dissolved resinous materials along with the lower extract phase, and recovering said sulfolane from said extract phase.

8. A process according to claim 7 wherein the extract phase containing sulfolane and dissolved resinous materials is subjected to (a) stripping of $SO_2$ from the extract phase, (b) injection of water into the remaining extract material substantially free of $SO_2$, (c) separation of the water phase and oil phase which is subsequently dehydrated and recovered as product extract, (d) distilling the water phase to remove $SO_2$ and water therefrom, (e) subjecting the distillation residue to vacuum distillation to recover sulfolane for recycle, and (f) recovering the resin from the vacuum distillation zone.

References Cited

UNITED STATES PATENTS

| 2,777,800 | 1/1957 | Mitchell et al. | 208—321 |
| 2,905,638 | 9/1959 | Hettick | 208—338 |
| 3,003,006 | 10/1961 | Francis | 208—321 |
| 3,340,185 | 9/1967 | Little et al. | 208—338 |

HERBERT LEVINE, Primary Examiner

U.S. Cl. X.R.

208—323, 325